US011865694B2

(12) United States Patent
Staffa

(10) Patent No.: US 11,865,694 B2
(45) Date of Patent: Jan. 9, 2024

(54) ROTARY DRIVING TOOL FOR HANDLING CLOSURE ELEMENTS

(71) Applicant: DÜRR SOMAC GmbH, Stollberg (DE)

(72) Inventor: Uwe Staffa, St. Egidien (DE)

(73) Assignee: DÜRR SOMAC GmbH, Stollberg (DE)

( * ) Notice: Subject to any disclaimer, the term of this patent is extended or adjusted under 35 U.S.C. 154(b) by 134 days.

(21) Appl. No.: 17/430,250

(22) PCT Filed: Feb. 17, 2020

(86) PCT No.: PCT/DE2020/000033
§ 371 (c)(1),
(2) Date: Aug. 11, 2021

(87) PCT Pub. No.: WO2020/173518
PCT Pub. Date: Sep. 3, 2020

(65) Prior Publication Data
US 2022/0250252 A1    Aug. 11, 2022

(30) Foreign Application Priority Data
Feb. 25, 2019 (DE) ..................... 10 2019 001 407.3

(51) Int. Cl.
*B25J 15/10* (2006.01)
*B25J 11/00* (2006.01)
(Continued)

(52) U.S. Cl.
CPC ............. *B25J 11/005* (2013.01); *B23P 19/06* (2013.01); *B25J 15/10* (2013.01); *B25J 17/0208* (2013.01)

(58) Field of Classification Search
CPC ...... B25J 11/005; B25J 15/10; B25J 17/0208; B23P 19/06; B67D 7/0401
See application file for complete search history.

(56) References Cited

U.S. PATENT DOCUMENTS

2003/0164200 A1    9/2003    Czeranna et al.
2006/0169350 A1    8/2006    Hollerback
(Continued)

FOREIGN PATENT DOCUMENTS

DE    102009020312 A1    11/2010
EP    0540777 A1    5/1993
(Continued)

OTHER PUBLICATIONS

International Search Report (in English and German) and Written Opinion of the ISA (in German) issued in PCT/DE2020/000033, dated Jun. 16, 2020; ISA/EP.

*Primary Examiner* — Rick K Chang
(74) *Attorney, Agent, or Firm* — Harness, Dickey & Pierce, P.L.C.

(57) ABSTRACT

The disclosure relates to a rotary driving tool for handling closure elements on vehicle containers for holding operating fluids, which are fed into the respective circuits and containers of the vehicles in the manufacturing process of the vehicles on assembly lines of the automotive industry by robot-based assemblies arranged on the assembly line from filling systems via connecting lines and adapters, wherein the robot-based assemblies are displaceable in operation between a home position and a filling position and have at least one robot arm. It is the problem of the disclosure to create such a rotary driving tool that enables automated handling of the closure elements even in confined or poorly accessible installation spaces. This problem is solved in that the rotary driving tool has a plate-shaped base body, a centric gripper, a drive motor, a first pneumatic compensating element for deviations in the XY plane and a second pneumatic compensating element for deviations in the Z direction, wherein specific designs and arrangements are proposed for these assemblies.

18 Claims, 2 Drawing Sheets

(51) Int. Cl.
*B23P 19/06* (2006.01)
*B25J 17/02* (2006.01)

(56) References Cited

U.S. PATENT DOCUMENTS

2018/0297158 A1* 10/2018 Barzelay ................. B25B 21/02
2018/0297181 A1* 10/2018 Barzelay ................. B25B 13/18
2018/0311775 A1* 11/2018 Dieter .................... B25J 9/1687

FOREIGN PATENT DOCUMENTS

| | | |
|---|---|---|
| EP | 2053016 A1 | 4/2009 |
| EP | 2540457 A2 | 1/2013 |
| JP | H0228072 A | 1/1990 |
| JP | H06179191 A | 6/1994 |
| JP | 2003211384 A | 7/2003 |
| JP | 2009214920 A | 9/2009 |
| WO | WO-9403391 A1 | 2/1994 |

\* cited by examiner

ROTARY DRIVING TOOL FOR HANDLING CLOSURE ELEMENTS

CROSS-REFERENCE TO RELATED APPLICATIONS

This application is a U.S. National Phase application under 35 U.S.C 371 of International Application No. PCT/DE2020/000033, filed on Feb. 17, 2020, which claims the benefit of German Patent Application No. 10 2019 001 407.3, filed on Feb. 25, 2019. The entire disclosures of the above applications are incorporated herein by reference.

FIELD

The disclosure relates to a rotary driving tool for handling closure elements, and particularly closure elements on vehicle containers for holding operating fluids, which are fed into the respective circuits and containers of the vehicles in the manufacturing process of the vehicles on assembly lines of the automotive industry by robot-based assemblies arranged on the assembly line from filling systems via connecting lines and adapters, wherein the robot-based assemblies are displaceable in operation between a home position and a filling position and have at least one robot arm.

BACKGROUND

This section provides background information related to the present disclosure which is not necessarily prior art.

On assembly lines in the automotive industry, the manufacturing process involves filling housings, circuits, expansion tanks and similar assemblies of the vehicles with operating fluids. Brake fluid, radiator fluid, refrigerant, or windshield washer fluid, for example, are fed from filling systems into the respective circuits and tanks of the vehicles via connecting lines and adapters. This filling is usually carried out by workers who guide the adapters for each operating fluid to the vehicle, adapt them to the respective vehicle containers, and deadapt them again after the filling is completed. The principle of such assembly lines is known, for example, from US 2003 0164 200 A1.

Since such handling is manual and time-consuming for the worker, robot-based devices are increasingly used for filling operations. In this respect, DE 10 2009 020 312 A1 proposes that at least one operating fluid is filled using a robot when filling vehicles at assembly lines in the automotive industry. A device is known from US 2006/0169 350 A1 in which several operating fluids are filled from storage containers into in-vehicle receiving containers. The connection between the storage container and the receiving container is implemented with a robot.

These technical solutions relieve the worker of a physically demanding and monotonous job. At the same time, a reduction in filling time can be achieved. However, despite the enormous development and manufacturing costs of robot-based devices, the involvement of a worker is often still necessary, for example, to remove blind plugs (e.g., threaded plugs) from the container to be filled prior to filling or to open closures and then close them again. This is disadvantageous because the aim increasingly is to automatically fill a vehicle with all operating fluids using robot-based devices.

For such applications, it is known to operate the blind plugs and caps by a robot-based device with a rotary driving tool, such as a drill driver or impact driver. However, the practical implementation of this basic idea is problematic. This is because the rotary motion (e.g., for screwing or unscrewing a threaded plug or cover) and similar movements must be carried out in a very short period of time with a high degree of accuracy and functional reliability. Furthermore, modification of the tools is also necessary in case of short-term changing operating conditions (e.g. production of vehicles with different equipment variants on the same assembly line). These requirements can only be met to a limited extent with the driving tools known in the market. Problems arise particularly if the free installation space available for the driving tool is very limited or poorly accessible.

SUMMARY

This section provides a general summary of the disclosure, and is not a comprehensive disclosure of its full scope or all of its features.

The problem addressed by the disclosure is to create a rotary driving tool for automated handling of, e.g., threaded closure elements on containers of vehicles to be filled with operating fluids on assembly lines in the automotive industry. This is also intended to enable application in confined or poorly accessible installation spaces.

This problem is solved in that the driving tool has a plate-shaped base body, a centric gripper, a drive motor, a first pneumatic compensating element for deviations in the XY plane and a second pneumatic compensating element for deviations in the Z direction. As usual, X/Y/Z designate in this case the spatial coordinates in horizontal and vertical orientation.

The centric gripper is screwed to a hollow shaft and arranged on the bottom side of the base body. Furthermore, the centric gripper has a pneumatic drive for triggering gripping movements and a mechanical drive for triggering rotational movements about its central longitudinal axis. Preferably, the centric gripper is designed as a three-jaw gripper with three gripper jaws, although a different number of gripper jaws is also possible depending on the specific application requirements. The mechanical drive for triggering rotational movements comprises a first gear wheel arranged below the base body and connected to the centric gripper.

The first gear wheel is connected to another (i.e., second) gear wheel arranged at the output of the drive motor via a toothed belt guided on the bottom side of the base body. The drive motor is supported on the top side of the base body, and the associated second gearwheel is located below the base body. The gripper jaws are screwed to the centric gripper and are brought into positive contact with the closure element via a groove and into frictional contact with the closure element with their inner surfaces.

The pneumatic compensating element for deviations in the Z direction and the pneumatic compensating element for deviations in the XY direction are arranged one above the other and along a common central longitudinal axis on the top side of the base body adjacent to the drive motor. The order in which order the two separate compensating elements are arranged one above the other is functionally irrelevant. It is only essential that both compensating elements are present to be able to implement lateral (XY plane) and height (Z direction) compensation of tolerances.

Advantageous embodiments, the technical features of which will be explained in more detail based on an exemplary embodiment, are also the subject matter of the disclosure.

The basic approach to solving the problem thus relates to a height-optimized driving tool which, as a compact unit, is suitable for handling closure elements preferably in confined and/or poorly accessible installation or handling spaces. A preferred application in this respect is the automated handling of closure elements on vehicle containers to be filled with operating fluids on assembly lines in the automotive industry. By means of the driving tool according to the disclosure, a dust protection cap (e.g. temporary cover up till filling) or a screw cap (e.g. cover of the container for the brake fluid) can be dismantled fully automatically and reassembled fully automatically after filling has been completed, such that the respective container is closed fully automatically. This driving tool can thus be advantageously integrated into a fully automatic and synchronous filling of a vehicle with several robots for different operating fluids (e.g. brake fluid, refrigerant, coolant, windshield washer fluid, etc.).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Exemplary embodiments are explained below with reference to the drawings, wherein.

DETAILED DESCRIPTION

Figure 1:
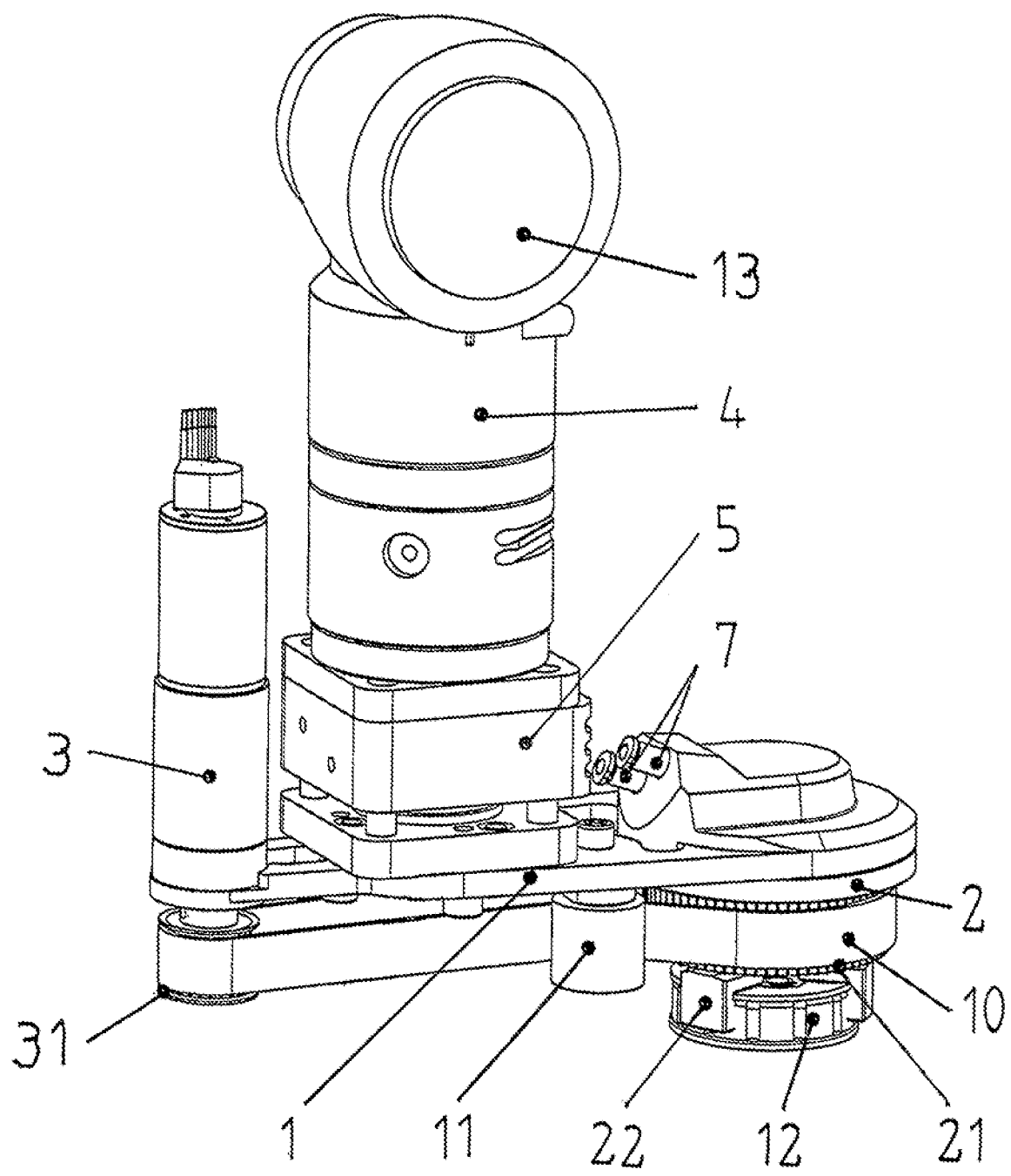
FIG. 1 shows a perspective view of the general structure of a driving tool according to the disclosure.

Example embodiments will now be described more fully with reference to the accompanying drawings.

The driving tool shown in the drawings is designed for handling closure elements on vehicle containers for holding operating fluids which are fed into the respective circuits and containers of the vehicles from filling systems arranged on the assembly line via connecting lines and adapters during the manufacturing process of the vehicles on assembly lines in the automotive industry by robot-based assemblies. In this case, the robot-based assemblies can be displaced between a home position and a filling position during operation and feature a robot arm.

According to FIG. 1, the driving tool has a plate-shaped base body 1, a centric gripper 2 with multiple gripper jaws 22 (e.g. three-jaw gripper), a drive motor 3 (e.g. servo gear motor or stepper motor), a first pneumatic compensating element 4 for deviations in the XY plane, and a second pneumatic compensating element 5 for deviations in the Z direction.

Figure 2:
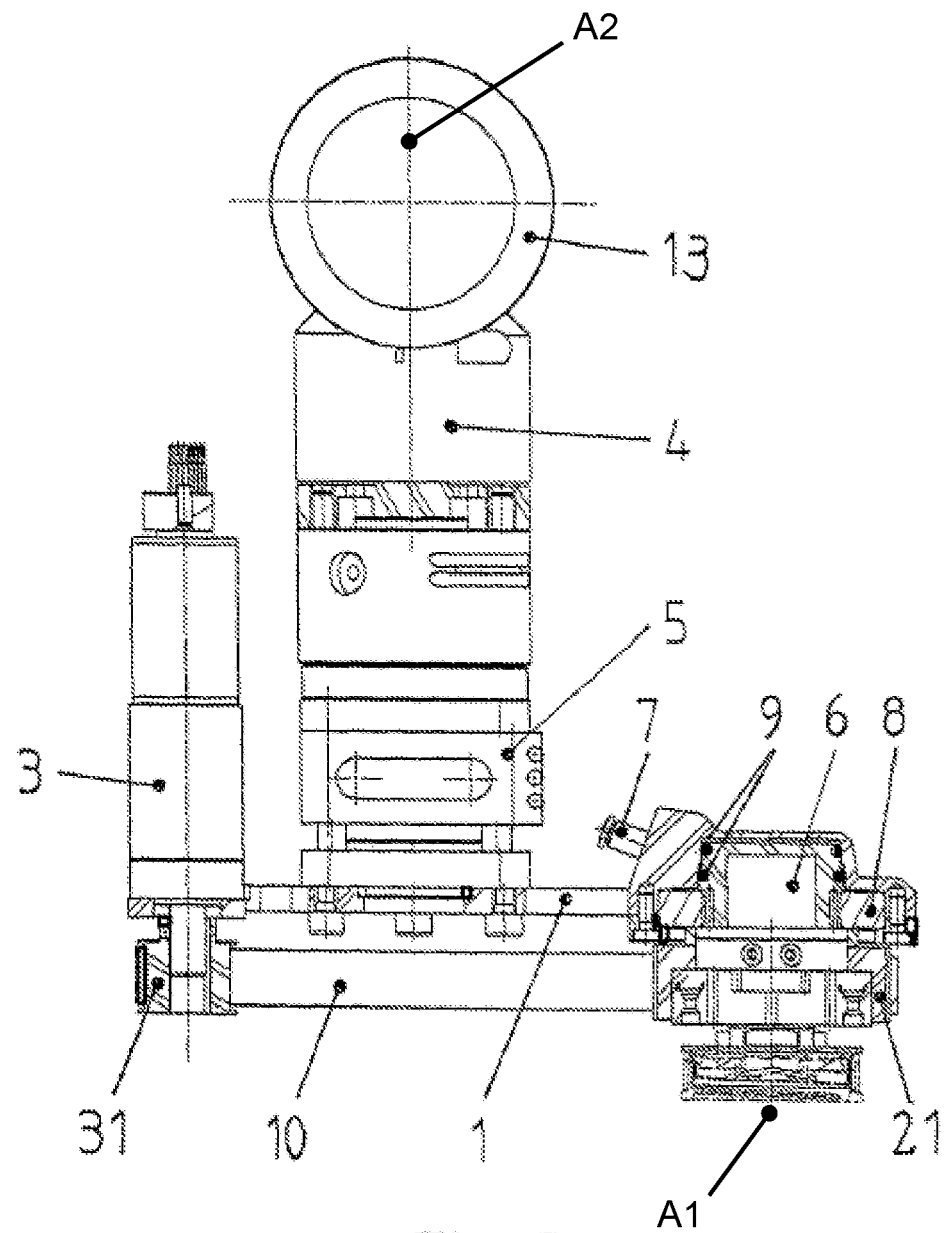
FIG. 2 shows a partial sectional view of the driving tool according to FIG. 1.

The centric gripper 2 is arranged on the bottom side of the plate-shaped base body 1 and has a pneumatic drive for triggering movements of the gripper jaws 22 screwed to the centric gripper 2, as well as a mechanical drive for triggering rotational movements about its central longitudinal axis A1. The centric gripper 2 is attached to the hollow shaft 6. Details of the hollow shaft 6 can be seen in FIG. 2. Accordingly, pneumatic lines for driving the centric gripper 2 are provided in the hollow shaft 6. The port for the pneumatic lines is designated with reference numeral 7. The hollow shaft 6 is located in a four-point bearing 8. Furthermore, the hollow shaft 6 has two seals 9. These seals 9 form a rotary union with the plate-shaped base body 1.

The mechanical drive for triggering rotational movements comprises a first gear wheel 21 arranged below the plate-shaped base body 1 and connected to the centric gripper 2. This gear wheel 21 is connected to a second gear wheel 31 arranged at the output shaft of the drive motor 3 via a toothed belt 10 also located on the bottom side of the base body 1. The drive motor 3 is supported on the top of the base body 1, and the gear wheel 31 is arranged below the base body 1. The belt tension of the toothed belt 10 is implemented with an eccentric tensioning roller 11, which is also arranged on the bottom side of the base body 1.

The pneumatic compensation element 5 is moveable and/can provide positional adjustments for tolerance deviations in the Z direction and the pneumatic compensation element 4 is moveable and/or can provide positional adjustments for tolerance deviations in the XY direction are arranged one above the other and along a common central longitudinal axis A2 on the top side of the plate-shaped base body 1, starting from the latter and adjacent to the drive motor 3.

The driving tool constructed in this way is firmly attached to the movable end section of a robot hand 13 of a robot arm not shown in the drawing. The robot first uses an optical measuring system to determine the current position of the closure element on the container and moves to this position with the driving tool. Additional minor adjustments to the position of the driving tool and/or the centric gripper 2 to compensate for tolerance deviations can be made via the pneumatic compensation elements 4 and 5. For example, adjustments can be performed via compensation element 4 for deviations in the XY plane and via compensation element 5 for deviations in the Z direction to more accurately position the driving tool and/or the centric gripper 2 relative to the closure element 12. The closure element 12 is then gripped by the pneumatically operable centric gripper 2. The gripper jaws 22 screwed to the centric gripper 2 create a form fit via a groove and a force fit with the closure element 12 via the inner surfaces. The form fit is sufficient for handling a dust protection cap as a closure element 12, while a force fit is necessary for handling a screw cap as a closure element 12. The rotary movement required to open or close (e.g., unthread or thread) the closure element 12 is initiated by the drive motor 3, which transmits its drive torque to the centric gripper 2 via the gear wheel 31, the toothed belt 10, and the gear wheel 21. The toothed belt 10 is tensioned by the eccentric tensioning roller 11.

If the driving tool is used, for example, for filling brake fluid, it should be noted that the brake fluid reservoir must remain closed until shortly before filling for safety reasons. It is installed in the vehicle either with a dust protection cap 12 or already with the actual screw cap 12. In the first variant, the dust protection cap 12 is grasped immediately before filling with the driving tool and deposited at a location that cannot be defined very precisely (e.g. grid box). In the second variant, the screw cap 12 is also detected immediately prior to filling by means of the driving tool. However, the cap is then either deposited in a position from which it can be accurately gripped again for subsequent closing after filling, or it remains in engagement with the driving tool during the entire filling process. Regardless of the variant selected, the screw cap 12 is always screwed tightly onto the container with the driving tool after the filling process has been completed.

The foregoing description of the embodiment has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A rotary driving tool for handling closure elements on containers for holding operating fluids for an automobile, which containers are filled on an assembly line during a manufacturing process of the automobile by robot-based assemblies arranged on the assembly line from filling systems via connecting lines and adapters, wherein the robot-based assemblies are displaceable in operation between a home position and a filling position and have at least one robot arm, wherein
the rotary driving tool has a plate-shaped base body, a centric gripper, a drive motor, a first pneumatic compensating element for making first adjustments in an XY plane and a second pneumatic compensating element for making second adjustments in a Z direction, wherein the centric gripper is attached to a hollow shaft and arranged below the base body, and has a pneumatic drive for triggering gripping movements, a mechanical drive for triggering rotational movements about a first longitudinal axis, and a plurality of gripper jaws,
wherein the mechanical drive has a first gear wheel arranged below the base body and connected to the centric gripper, a second gear wheel arranged below the base body and at an output of the drive motor, the first gear wheel being connected to the second gear wheel via a toothed belt arranged below the base body, wherein the drive motor is supported above the base body,
wherein the each of the plurality of gripper jaws is attached to the centric gripper and is configured to frictionally lock with an inner surface of a groove of a closure element,
wherein the second pneumatic compensating element and the first pneumatic compensating element are each arranged one above the other and along a second longitudinal axis above the base body and adjacent to the drive motor, and
wherein the rotary driving tool is configured to attach to a movable end section of a robot hand of the at least one robot arm.

2. The rotary driving tool according to claim 1, wherein the plurality of gripper jaws comprises three gripper jaws.

3. The rotary driving tool according to claim 1, wherein the drive motor is a servo gear motor.

4. The rotary driving tool according to claim 1, wherein the drive motor is a stepper motor.

5. The rotary driving tool according to claim 1, wherein pneumatic lines are provided in the hollow shaft.

6. The rotary driving tool according to claim 1, wherein the hollow shaft is supported in a four-point bearing.

7. The rotary driving tool according to claim 1, wherein the hollow shaft has two seals which form a rotary union in operative connection with the base body.

8. The rotary driving tool according to claim 1, further comprising
an eccentric tensioning roller which is operatively connected to the toothed belt and arranged below the base body.

9. A rotary driving tool for handling a closure element on a container, the rotary driving tool configured for attachment to a robot arm that, in operation, is displaceable between a home position and a use position, the rotary driving tool comprising:
a base;
a drive motor supported above the base and comprising a rotatable output shaft;
a first wheel arranged below the base and connected to the rotatable output shaft of the drive motor;
a gripper supported below the base and attached to a hollow shaft, the gripper comprising:
a plurality of jaws movable between a gripping position and a non-gripping position, wherein in the gripping position the jaws are configured for engaging a groove in the closure element;
a driver for controlling movement of the plurality of jaws, wherein the driver comprises a plurality of pneumatic lines disposed in the hollow shaft; and
a mechanical drive for controlling rotational movement of the plurality of jaws about a first central longitudinal axis of the gripper, wherein the mechanical drive comprises a second wheel arranged below the base, the second wheel being coupled to the first wheel by a belt; and
a first compensator movable in an X-Y plane and a second compensator movable in a Z direction, wherein both the first compensator and the second compensator are located above the base and positioned along a second central longitudinal axis.

10. The rotary driving tool according to claim 9, wherein the rotary driving tool is configured to attach to a movable end section of a robot hand of the robot arm.

11. The rotary driving tool according to claim 9, wherein the plurality of jaws comprises three jaws.

12. The rotary driving tool according to claim 9, wherein the drive motor comprises a servo gear motor.

13. The rotary driving tool according to claim 9, wherein the drive motor comprises a stepper motor.

14. The rotary driving tool according to claim 9 wherein the hollow shaft is supported by a four-point bearing.

15. The rotary driving tool according to claim 14, wherein the hollow shaft comprises a plurality of seals which form a rotary union in operative connection with the base.

16. The rotary driving tool according to claim 9, wherein the hollow shaft comprises a plurality of seals which form a rotary union in operative connection with the base.

17. The rotary driving tool according to claim 9, wherein an eccentric tensioning roller is located beneath the base and operatively connected to the belt.

18. The rotary driving tool according to claim 9, wherein the first compensator and the second compensator are located near to the drive motor.

* * * * *